United States Patent [19]
Yamamoto et al.

[11] Patent Number: 5,520,269
[45] Date of Patent: May 28, 1996

[54] FLOATING TYPE BRAKE DISK ASSEMBLY

[75] Inventors: Shusuke Yamamoto, Hamamatsu; Michikiyo Hiasa, Tochigi-ken, both of Japan

[73] Assignee: Kabushiki Kaishia Yutaka Giken, Hamamatsu, Japan

[21] Appl. No.: 516,688

[22] Filed: Aug. 18, 1995

Related U.S. Application Data

[63] Continuation of Ser. No. 181,096, Jan. 13, 1994, abandoned.

[30] Foreign Application Priority Data

Feb. 10, 1993 [JP] Japan ................................ 5-003896 U
Jun. 4, 1993 [JP] Japan ................................ 5-030047 U

[51] Int. Cl.$^6$ .................................................. F16D 65/12
[52] U.S. Cl. ................................................. 188/218 XL
[58] Field of Search .......................... 188/218 R, 218 XL

[56] References Cited

U.S. PATENT DOCUMENTS

| | | | |
|---|---|---|---|
| 4,580,673 | 4/1986 | Graton | 188/218 XL X |
| 4,645,041 | 2/1987 | Bass | 188/218 XL X |
| 4,967,893 | 11/1990 | Vogele | 188/218 XL X |

FOREIGN PATENT DOCUMENTS

| | | | |
|---|---|---|---|
| 0287017A2 | 10/1988 | European Pat. Off. | |
| 0287017A3 | 10/1988 | European Pat. Off. | |
| 291697 | 11/1988 | European Pat. Off. | 188/218 XL |
| 1091256 | 4/1955 | France | |
| 60-126736 | 8/1985 | Japan | |
| 209234 | 9/1987 | Japan | 188/218 XL |
| 63-45232 | 3/1988 | Japan | |
| 1-40347 | 12/1989 | Japan | |
| 2-42900 | 11/1990 | Japan | |
| 2157781 | 10/1985 | United Kingdom | 188/218 XL |

*Primary Examiner*—Matthew C. Graham
*Attorney, Agent, or Firm*—Armstrong, Westerman, Hattori, McLeland & Naughton

[57] ABSTRACT

A floating type brake disc assembly has a hub and an annular disc which is concentrically disposed around the hub. The hub and the disc have plural sets of connecting dents each set being opposingly provided in a connecting portion of the hub and the disc. A hollow pin which has a flange on one end is inserted into each set of the connecting dents such that the hub and the disc are connected together while allowing for a slight floating movement between the two members. The hollow pin has a thick-wall tube portion which lies next to the flange and is adapted to be inserted into each set of the connecting dents and a thin-wall tube portion which has an outer diameter smaller than that of the thick-wall tube portion and is provided next to the thick-wall portion away from the flange. The thin-wall tube portion is caulked with its outer periphery bending towards one side surface of the connecting portion to form a caulked flange such that the outer periphery holds the above-described one side surface of the connecting portion.

1 Claim, 4 Drawing Sheets

FIG._7
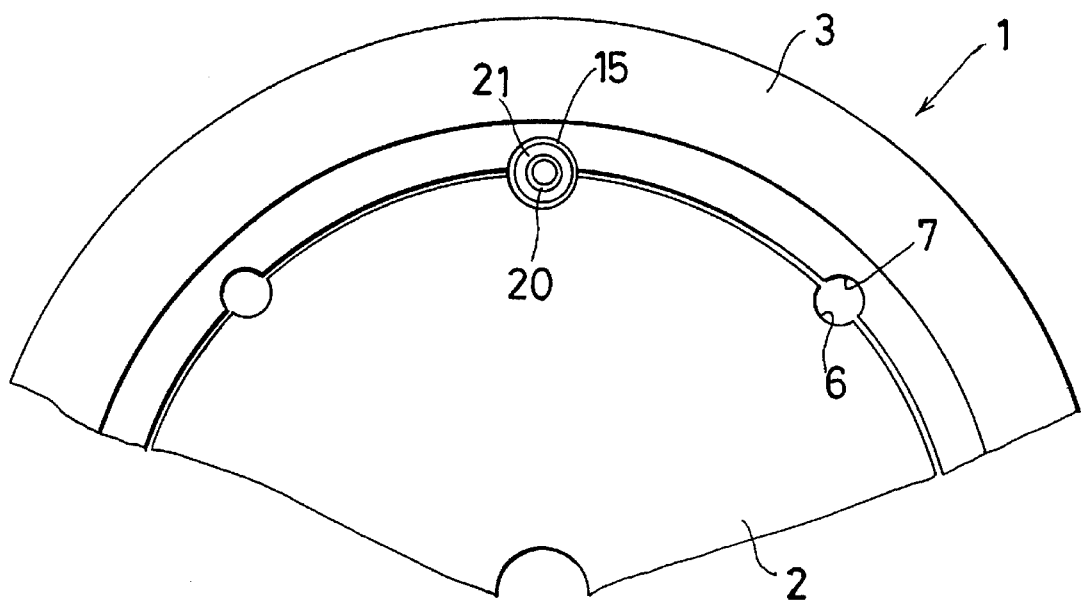
FIG._8(a)
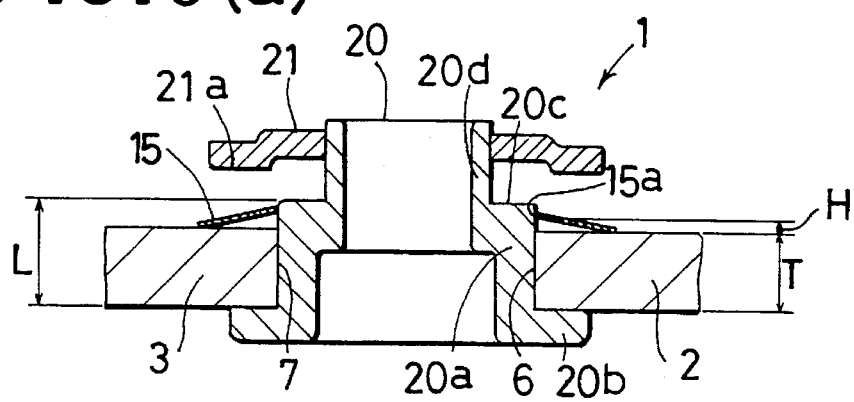
FIG._8(b)
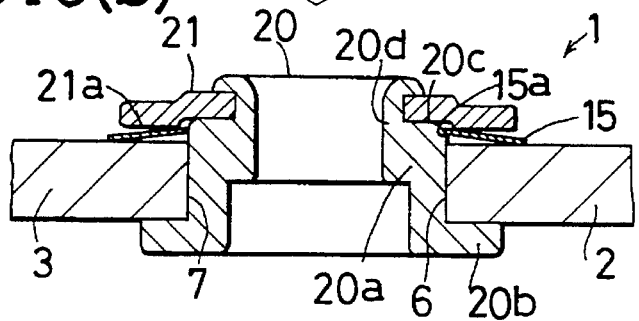

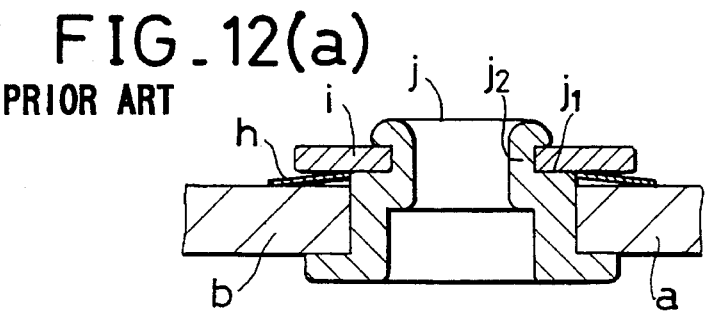
FIG_12(a) PRIOR ART
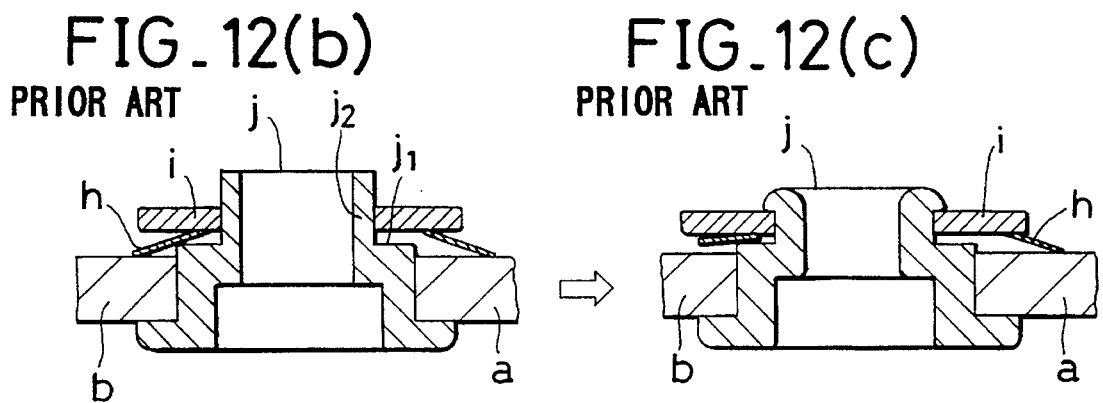
FIG_12(b) PRIOR ART
FIG_12(c) PRIOR ART
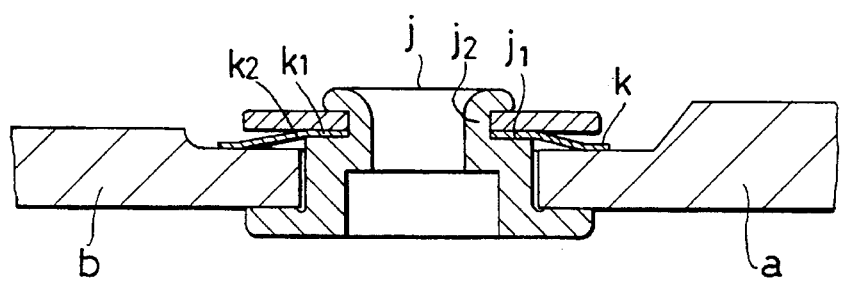
FIG_13 PRIOR ART 5,520,269

FLOATING TYPE BRAKE DISK ASSEMBLY

This application is a continuation of application Ser. No. 08/181,096 filed Jan. 13, 1994, now abandoned.

BACKGROUND OF THE INVENTION

1. Field of the Invention

The present invention relates to a floating type brake disk assembly which is used for braking vehicles or the like and which can be thermally expanded freely when a disc is heated to a high temperature due to a friction heat at the time of braking.

2. Description of Related Art

A conventional hollow pin to be used for connecting a disc to a hub in a manner slightly displaceable relative to each other in the axial direction has the construction as shown in Japanese Published Unexamined Utility Model Registration Application 40347/1989. The construction is as shown in FIG. 11 in which reference mark "a" denotes a hub, b denotes a disc and c denotes a pin. The pin c has a flange d, a stepped portion e and a small-diameter portion f. After the pin c has been inserted into a pair of connecting dents or recesses which are provided in a connecting portion g of the hub "a" and the disc b, a coned disc spring h and a fixing washer i are fitted onto the small-diameter portion f. The coned disc spring h is held via the fixing washer i by a caulked portion f' which is formed by caulking an end of the small-diameter portion. Both side surfaces of the hub "a" and of the disc b are thus held in a pinching manner by the coned disc spring h and the flange d. A torque is transmitted by the pin c and the clattering in the axial direction is prevented by the coned disc spring h.

As the coned disc spring h, there are two types as described in the above-described Japanese Utility Model Registration Application. One of them is as shown in FIG. 12(a). The same or substantially the same parts are affixed with the same marks as used hereinabove. The coned disc spring h is of a simple truncated cone and is inserted or placed into the dents which extend over the hub "a" and the annular disc b. The coned disc spring h is further fitted onto a pin j having a stepped portion $j_1$ and a small-diameter portion $j_2$ and is urged or pressed by a washer i which is held in position on the stepped portion $j_1$ by caulking.

However, this type of construction has the following disadvantage as shown in FIG. 12(b). Namely, the coned disc spring h is likely to be deviated or moved off the center at the time of assembling, and is therefore stepped onto the stepped portion $j_1$. If the pin j is caulked in this condition, as shown in FIG. 12(c), the coned disc spring h may contact the hub "a" but not the disc b and, consequently, elasticity cannot be worked or operated on the disc b.

The other type of coned disc spring k is provided, as shown in FIG. 13, with a bottom portion (or a top portion as seen in Figure) $k_1$ having a central hole. The central hole is fitted into the small-diameter portion $j_2$ of the pin j. According to this construction, there is no possibility that the coned disc spring k may deviate at the time of assembling. However, the portion $k_2$ in the periphery of the bottom portion is subjected to repeated bending and there is, therefore, a disadvantage in that this portion $k_2$ is likely to be fatigued.

The above-described brake disc assembly employs, aside from the hub "a" and the disk portion b, three more parts of a pin c, j, a coned disc spring h, k and a fixing washer i. Since many pins are used in one brake disc assembly, the number of associated coned disc springs h, k and fixing washers i becomes large. As a result, the costs of parts and assembling will inevitably become expensive.

In view of the above disadvantages, the present invention has an object of providing a floating type brake disc assembly that enables to decrease the number of parts. The present invention also has another object of providing a floating type brake disc assembly in which it is easy to set springs such as coned disc springs in a right position at the time of assembling, thereby enabling to apply a right set load, and in which the set load does not vary.

According to one aspect of the present invention, there is provided a floating type brake disc assembly which comprises: a hub; an annular disc which is concentrically disposed around the hub, the hub and the disc having plural sets of connecting dents each set of which is opposingly provided in a connecting portion of the hub and the disc; a hollow pin which has a flange on one end thereof and is inserted into each set of the connecting dents such that the hub and the disc are connected together while allowing for a slight floating movement therebetween. The hollow pin has a thick-wall tube portion which lies next to the flange and is adapted to be inserted into each of the connecting dents and a thin-wall tube portion which has an outer diameter smaller than that of the thick-wall tube portion and is provided next to the thick-wall tube portion away from the flange. The thin-wall tube portion is caulked with its outer periphery bending towards one side surface of the connecting portion to form a caulked flange such that the outer periphery holds the above-described one side surface of the connecting portion.

According to another aspect of the present invention, there is provided a floating type brake disc assembly which comprises: a hub; an annular disc which is disposed around the hub, the hub and the annular disc having plural sets of connecting dents; a pin which has a shaft portion on one side along the pin and a flange provided on one end of the shaft portion, the pin being adapted to be inserted into each set of the connecting dents; and a coned disc spring and a washer which are mounted on an opposite end of the shaft portion. The hub and the disc are thus held together in a pinched manner, when assembled, by the flange, the coned disc spring and the washer. The length of the shaft portion is set larger than a sum of a thickness of the hub or the disc and a height of the coned disc spring under no-load condition. The washer has an annular projection projecting towards the coned disc spring. The inner diameter of the annular projection is larger than an outer diameter of the shaft portion. The washer is fixedly seated, when assembled, onto an axially outer end of the opposite end of the shaft portion such that the annular projection presses the coned disc spring.

According to still another aspect of the present invention, there is provided a floating type brake disc assembly which comprises: a hub; an annular disc which is disposed around the hub, the hub and the disc having plural sets of connecting dents; a pin which has a shaft portion on one side along the pin and a flange provided on one end of the shaft portion, the pin being adapted to be inserted into each set of the connecting dents; a washer which is fixed to that end of the pin which is away from the flange; a spring which pressingly contacts a side surface of the hub and the disc, respectively, thereby holding, when assembled, the hub and the disc in a pinching manner by the flange, the washer and the spring; wherein the spring is disposed on the side of the flange of the pin.

According to the above-described one aspect of the present invention, the thin-wall tube portion on one end of the hollow pin is easily deformed at the time of caulking into a disc-like flange. This deforming does not substantially extend to or affect the thick-wall tube portion. Therefore, the thick-wall tube portion can be maintained in the shape and dimensions which correspond to the connecting dents. The flange obtained by caulking the thin-wall tube portion directly or indirectly abuts one side surface of the connecting portion of the hub and the disc. A lateral deviation or movement of the hub and the disk relative to each other is therefore prevented.

According to the above-described another aspect of the present invention, when the coned disc spring is fitted onto the pin at the time of assembling, since the upper or the inner end of the coned disc spring is positioned axially inward of the stepped portion or does not axially protrude beyond the stepped portion, the coned disc spring will not deviate or move in its position. Therefore, after the washer has been caulked, a predetermined set load is generated by the push with the annular projection.

According to still another aspect of the present invention, the deviation of the spring is prevented by the pin. The wear on the side surfaces of the hub and the disc by the spring can be prevented by a protection washer. Therefore, the amount of compression of the spring does not vary and consequently the variation in the set load can be prevented.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 7 is a partial front view of a fourth embodying example of the present invention;

FIGS. 8(a) and 8(b) are vertical sectional views thereof, in which FIG. 8(a) shows a condition before caulking of the pin and FIG. 8(b) shows a condition after caulking of the pin;

FIGS. 11(a) and 11(b) are vertical sectional views of an important portion of a conventional brake disc assembly, wherein FIG. 11(a) shows a condition before caulking of the pin and FIG. 11(b) shows a condition after caulking of the pin;

FIGS. 12(a) through 12(c) are vertical sectional views of another conventional brake disc assembly, wherein FIG. 12(a) shows a correct condition of assembling and FIGS. 12(b) and 12(c) show incorrect condition of assembling; and FIG. 13 is a vertical sectional view of still another conventional brake disc assembly.

DETAILED DESCRIPTION OF PREFERRED EMBODIMENTS

Figure 1:
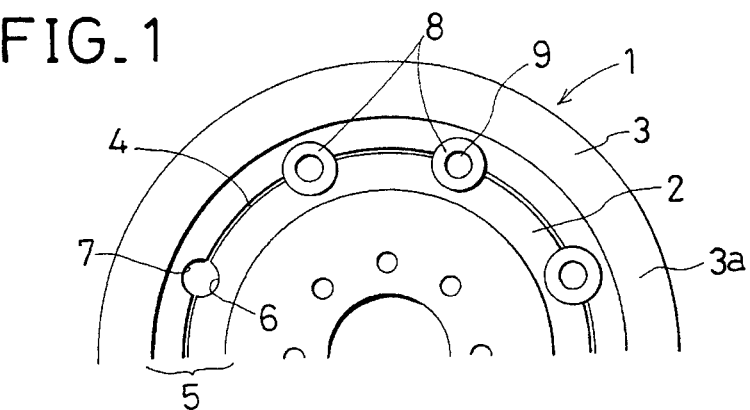
FIG. 1 is a partial front view of a floating type brake disc assembly of a first embodying example according to the present invention.

FIGS. 1 through 4 show a first embodying example of a floating type brake disc assembly according to the present invention. In FIG. 1 numeral 1 denotes a floating type brake disk assembly, numeral 2 denotes a hub and numeral 3 denotes a ring-like or annular disc for applying thereto a braking force. On both sides of the disc 3, there are provided friction surfaces 3a with which brake pads come into contact. The hub 2 and the disc 3 are disposed concentrically to each other. In order to allow for thermal distortion of the disc 3 at the time of braking, there is provided a small clearance 4 between the hub 2 and the disc 3. Along the clearance 4 there is provided a connecting portion 5 of the same thickness. The connecting portion 5 is provided with plural sets of semicircular connecting recesses or dents 6, 7 which face each other in the radial direction so as to fixedly receive in each of them a hollow pin 8.

Figure 2:
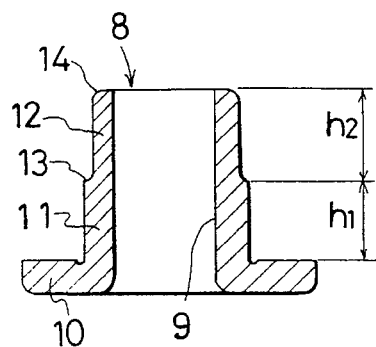
FIG. 2 is a vertical sectional view of a pin to be used therein.
Figure 3:
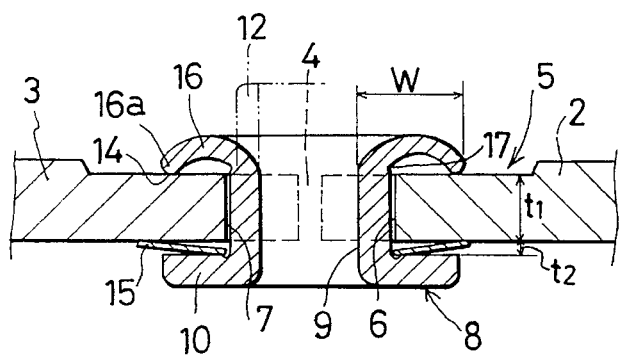
FIG. 3 is a vertical sectional view of an important portion of the first embodying example.

The hollow pin 8 has, as shown in FIGS. 2 and 3, a central hole 9, a flange 10, a thick-wall tube portion 11 and a thin-wall tube portion 12. A stepped portion 13 is formed between the two tube portions 11, 12, and a rounded or arcuate portion 14 is formed on a periphery of an external end of the thin-wall tube portion 12. This hollow pin 8 is inserted into each set of the connecting recesses 6, 7 with a coned disc spring 15 being fitted in contact with the flange 10. The thin-wall tube portion 12 is caulked into an arc in cross-section to form a caulked flange 16. In the outer periphery 16a of the caulked flange the arcuate portion 14 which will then be positioned in an inner side of the caulked flange 16 is in contact with one side surface of the connecting portion 5.

The height $h_1$ of the thick-wall tube portion 11 of the above-described pin 8 is arranged to be approximately equal to the sum of the thickness $t_1$ of the connecting portion 5 and the height $t_2$, after mounting or fitting, of the coned disc spring 15. The height $h_2$ of the thin-wall tube portion 12 is arranged to be slightly larger than the width W of the caulked flange 16 to be formed after caulking, the width W being attained as a result of shrinkage by caulking. This width W is made to be approximately equal to the width of the flange 10 on the outer or the other end of the pin 8.

Figure 4:
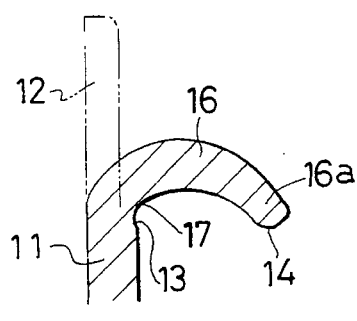
FIG. 4 is a partial vertical sectional view of a caulked flange.

The thin-wall tube portion 12 is bent at the time of caulking from above the stepped portion 13, as shown in FIG. 4. Though a portion 17 in which the tube wall is pushed or moved sideways to be increased in thickness is formed near the stepped portion 13, the above-described portion 17 will not protrude or protect out of the outer diameter of the thick-wall tube portion 11 because the thin-wall tube portion 12 is smaller in diameter than the outer diameter of the thick-wall tube portion 11. As a result, the connecting dents 6, 7 are brought into contact only with the cylindrical external periphery of the thick-wall tube portion 11. Therefore, the braking torque is equally transmitted through the thick-wall tube portion 11 of each pin 8. The lateral deviation (i.e., the deviation in the axial direction of the pin) of the hub 2 and the disc 3 relative to each other is restricted by the coned disc spring 15 and the caulked flange 16.

Figure 5:
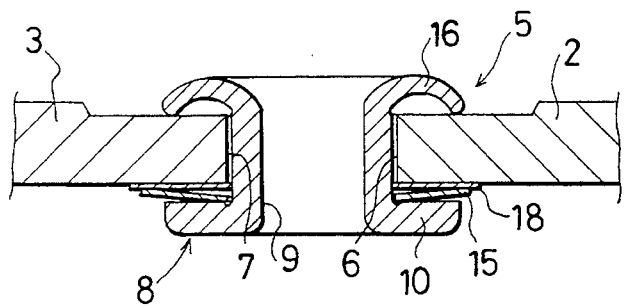
FIG. 5 is a vertical sectional view of a second embodying example of the present invention.

In the above-described first embodying example, the part to be auxiliary to the hollow pin 8 is only the coned disc spring 15. However, as in a second embodying example shown in FIG. 5, a protection washer 18 which is made of a thin metallic or steel plate and is not of a fixing construction may also be interposed on a surface of contact of the coned disc spring 15 with the connecting portion 5. In this manner, the surface of the contact portion can be prevented from being scored or scratched by the coned disc spring 15.

Figure 6:
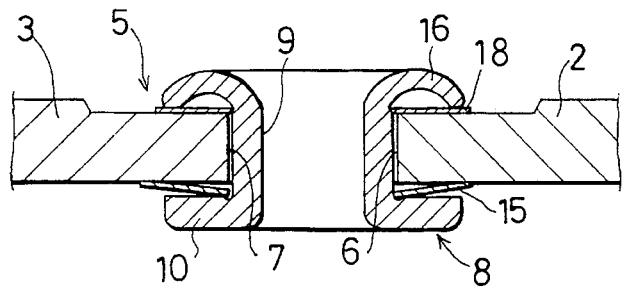
FIG. 6 is a vertical sectional view of a third embodying example of the present invention.

If there is a possibility that the scoring may take place on the side of the caulked flange 16, the protection washer 18 may be interposed on the side of the caulked flange 16 as shown in a third embodying example in FIG. 6.

In the above-described examples, the thin-wall tube portion 12 is formed by decreasing the outer diameter of the thin-wall tube portion 12. However, this thin-wall tube portion 12 may also be formed by enlarging the inner diameter thereof, aside from reducing the outer diameter thereof.

A fourth embodying example will now be explained with reference to FIGS. 7, 8(a) and 8(b). In these Figures the same or equivalent parts as those in FIGS. 1 through 6 are referred to by the same reference numerals and their explanations are avoided. In this embodying example, the hub 2 and the disc 3 are connected by a pin 20 which is inserted into each set of recesses 6, 7 so as to be slightly movable in the axial direction relative to each other. Further, the hub 2 and the disc 3 are prevented from giving rise to clattering by giving a resistance to the relative movement of the two members by means of the coned disc spring 15 which is held by the pin 20.

In each pin 20 there is formed, as shown in FIG. 8(a), a flange 20b on one end of a shaft or shank portion 20a. A stepped portion 20c and a small-diameter portion 20d are provided on the opposite end (or the end away from the flange 20b) of the pin 20. Suppose that the thickness of the hub 2 and the disc 3 is T and the height of the coned disc spring 15 in no-load condition is H, the length L of the shaft portion is set to be above T+H. The portion on the side of the hole (i.e., the inner end of the hole) of the coned disc spring 15 is thus prevented from riding or stepping over the stepped portion 20 by lateral deviation or moving of the coned disc spring 15.

In a position which is outside the outer periphery of the shaft portion 20a of the pin 20, a washer 20 is provided with a concentric annular projecting portion 21a which projects towards the side of the coned disc spring 15. The amount of step or projection of the projecting portion 21a is set to be equal to such a height as will give rise to a predetermined pressure by pressing the coned disc spring 15 when the washer 21 is seated on the stepped portion 20c.

The coned disc spring 15 and the washer 21 are fitted onto the pin 20 which is inserted into each set of the dents 6, 7 and, as shown in FIG. 8(b), the small-diameter tube portion 20d is caulked. Thus, the coned disc spring 15 is pressurized by the projecting portion 21a to thereby give rise to a predetermined set pressure. As long as the center hole 15a of the coned disc spring 15 is fitted onto the shaft portion 20a of the pin 20 at the time of assembling, the coned disc spring 15 is prevented by the shaft portion 20a from moving sideways.

Figure 9:
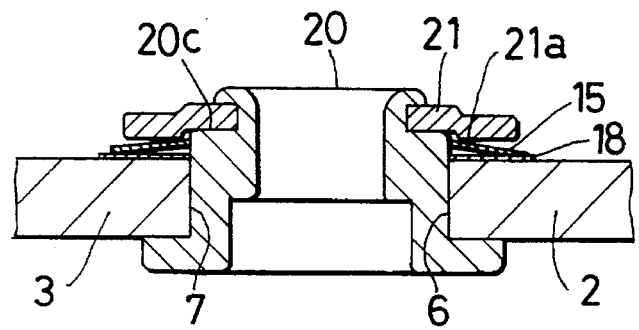
FIG. 9 is a vertical sectional view of a fifth embodying example of the present invention.

When the hub is made of a material which is likely to be subject to wear such as aluminum, a protection washer 18 having a high wear resistivity is interposed, as shown in FIG. 9, between one side surface of the hub 2 and the disc 3 and the coned disc spring 15 to thereby prevent the scratching or scoring especially of the surface of the hub, as well as the surface of the disc, by the coned disc spring 20c. In this case, the height of the coned disc spring 15 in an uncompressed condition is set to be such the upper or the inner end thereof is positioned substantially below the stepped portion 20c.

Figure 10:
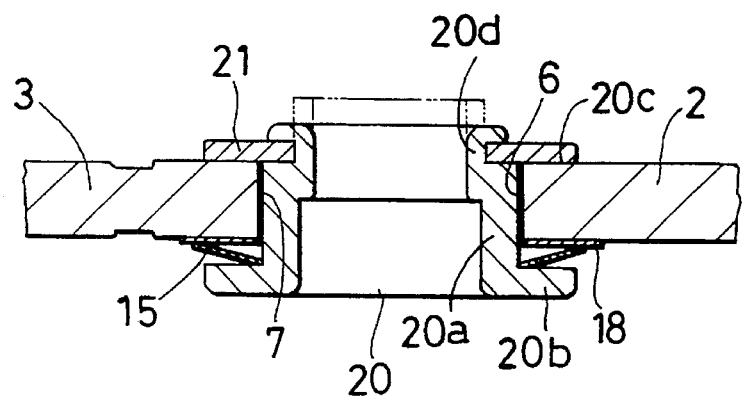
FIG. 10 is a vertical sectional view of a sixth embodying example of the present invention.
Figure 11A:
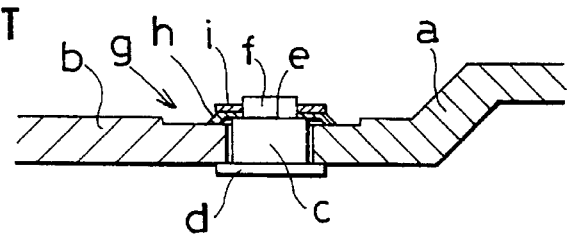
Figure 11B:
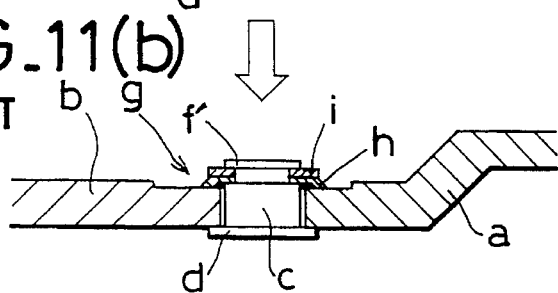

A sixth embodying example as shown in FIG. 10 is to prevent the lateral deviation or movement of the coned disc spring 15 by another arrangement. The coned disc spring 15 is disposed on the side of the flange 20b of the pin 20. The hub 2 and the disk 3 are pressed or urged via the protection washer 18. In assembling, the coned disc spring 15 and the protection washer 18 are first fitted onto the pin 20. Then, the pin 20 is inserted into each of the dents 6, 7 and the washer 21 is fitted onto the small-diameter portion 20d of the pin 20. The small-diameter portion 20d is thereafter caulked to thereby complete the assembly.

In this embodiment, not only the coned disc spring 15 but also the protection washer 18 are disposed on the side of the flange 20b of the pin 20. Therefore, there is no possibility that the coned disc spring 15 is wrongly caulked onto the stepped portion 20c.

In any of the above embodiments, a waved spring made by giving twisting or waving to a ring may also be used in place of the coned disc spring 15.

As described above, according to the first aspect of the present invention, since the thin-wall tube portion having a reduced outer diameter is provided on a front side of the thick-wall tube portion of the hollow pin and the thin-wall tube portion is then caulked, there are the following advantages. Namely, caulking can be made easily and the portion in which the tube wall is pushed or moved sideways to be increased in thickness at the bottom of the thin-wall tube portion will not protrude out of the outer diameter of the thick-wall tube portion. Therefore, the contact between the outer periphery of the thick-wall tube portion and the connecting dents of the hub and the disc is made correctly and, as a result, the torque is evenly distributed or borne by each of the hollow pins. Further, since the caulked flange formed by caulking the thin-wall tube portion supports or holds one side surface of the hub and the disc, a fixing washer can be deleted, with the result that the number of parts and the cost can be reduced.

According to another aspect of the present invention, since the coned disc spring is constructed such that the height of the central hole does not reach or protrude beyond the stepped portion of the pin in no-load condition, there is no possibility that, at the time of caulking, the coned disc spring is wrongly pinched onto the stepped portion. The assembly can therefore be carried out while maintaining the correct set load.

According to still another aspect of the present invention, since the coned disc spring is disposed on the side of the flange of the pin, almost the same effect as above can be obtained.

According to still further aspect of the invention, since the protection washer can prevent the side surface of the hub and the disc respectively from being scratched or scored by the edge of the hard spring, there is an advantage in that the change in load characteristics of the spring due to the wear can be prevented. Further, even if friction heat may occur at the time of braking, the protection washer can prevent the friction heat from being directly transmitted to the spring. The rise in temperature of the spring is therefore smaller. The change in set load characteristics of the spring due to the change in spring characteristics can thus be prevented.

It is readily apparent that the above-described floating type brake disc assembly meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A floating type brake disc assembly comprising:

a hub;

an annular disc which is concentrically disposed around said hub, said hub and said disc having plural sets of connecting dents each set of which is opposingly provided in a connecting portion of said hub and said disc;

a hollow pin which has a flange on one end thereof and is directly inserted into each set of said connecting dents such that said hub and said disc are connected together while allowing for a slight floating movement therebetween, wherein said hollow pin has a thick-wall tube portion which lies next to said flange and is adapted to be inserted into each set of said connecting dents and a thin-wall tube portion which has a thickness smaller than that of said thick-wall tube portion and is provided next to said thick-wall tube portion away from said flange; and a coned disc spring which is fitted onto said thick-wall tube portion so as to press an opposite side surface of said connecting portion;

wherein said thin-wall tube portion is caulked with its outer periphery bending towards one side surface of said connecting portion to form a caulked flange having an outer diameter larger than an outer diameter of said thick-wall tube portion such that said outer periphery holds said one side surface of said connecting portion, wherein a side surface of said outer periphery of said caulked flange is arcuate, said side surface coming into pressing contact, when caulked, with said one side surface of said connecting portion.

* * * * *